(No Model.) 3 Sheets—Sheet 1.
A. A. KENT.
MACHINE FOR PITTING FRUIT, &c.
No. 420,907. Patented Feb. 4, 1890.
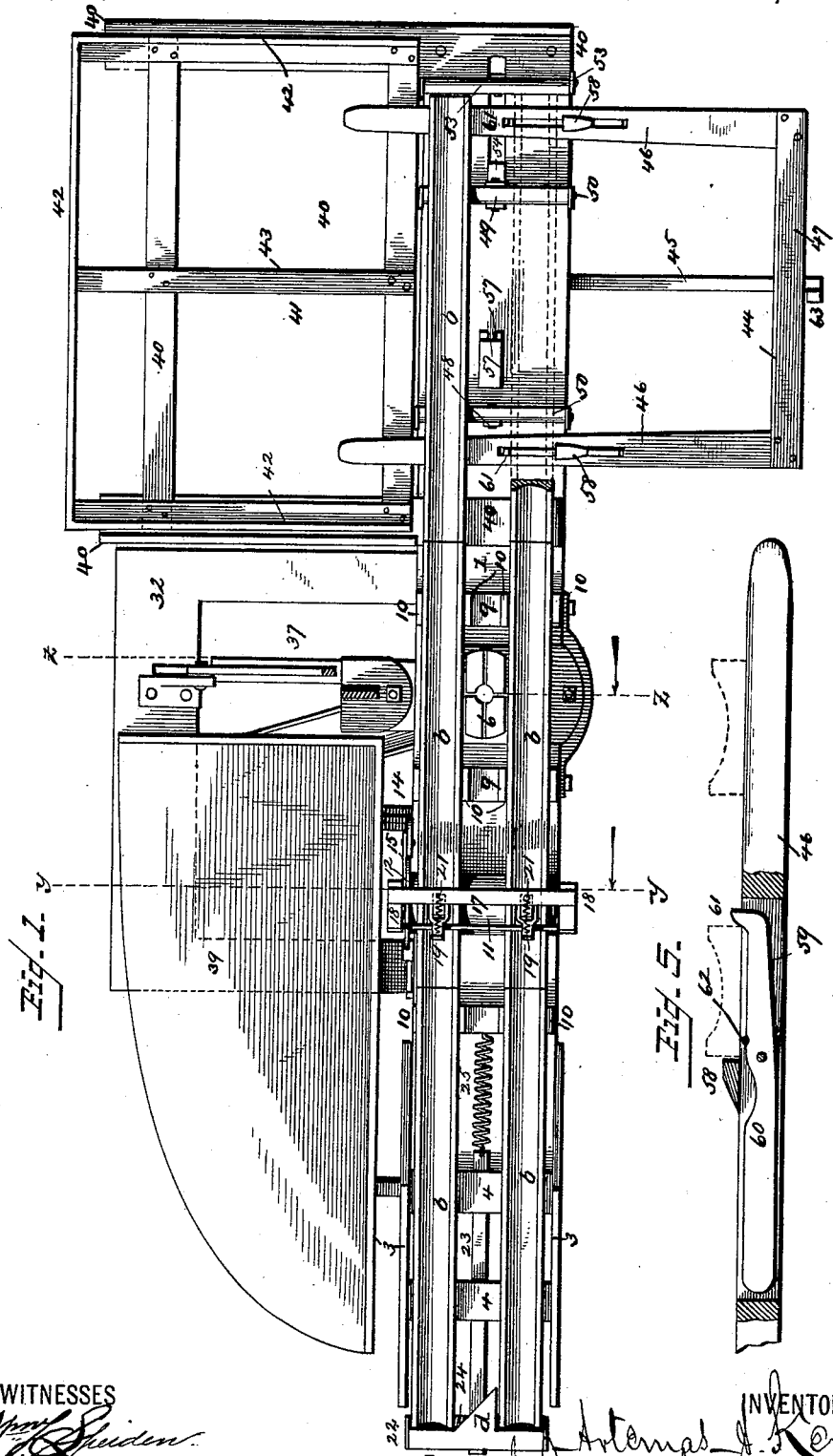
WITNESSES
INVENTOR
By his Attorneys

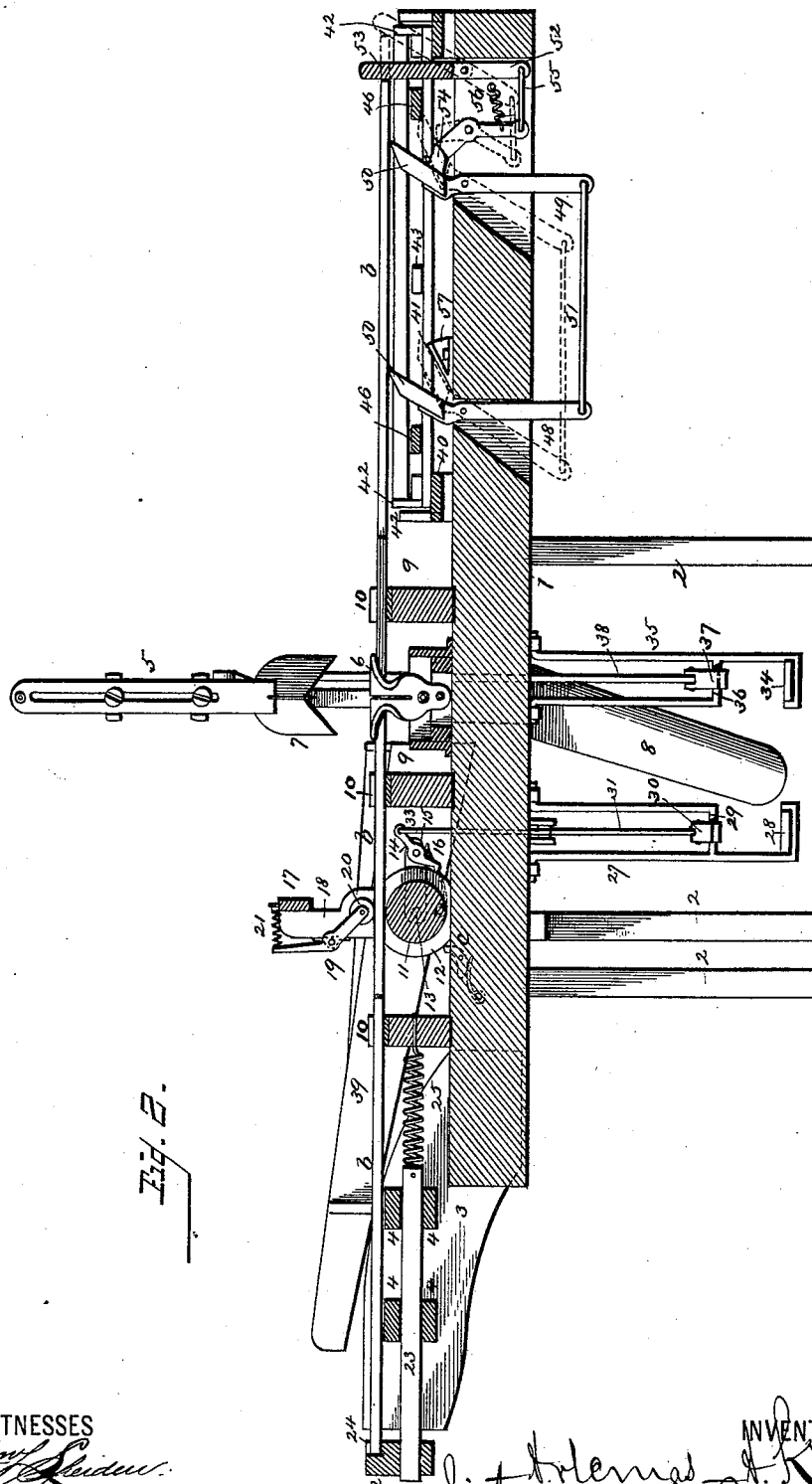

(No Model.) 3 Sheets—Sheet 3.
A. A. KENT.
MACHINE FOR PITTING FRUIT, &c.
No. 420,907. Patented Feb. 4, 1890.
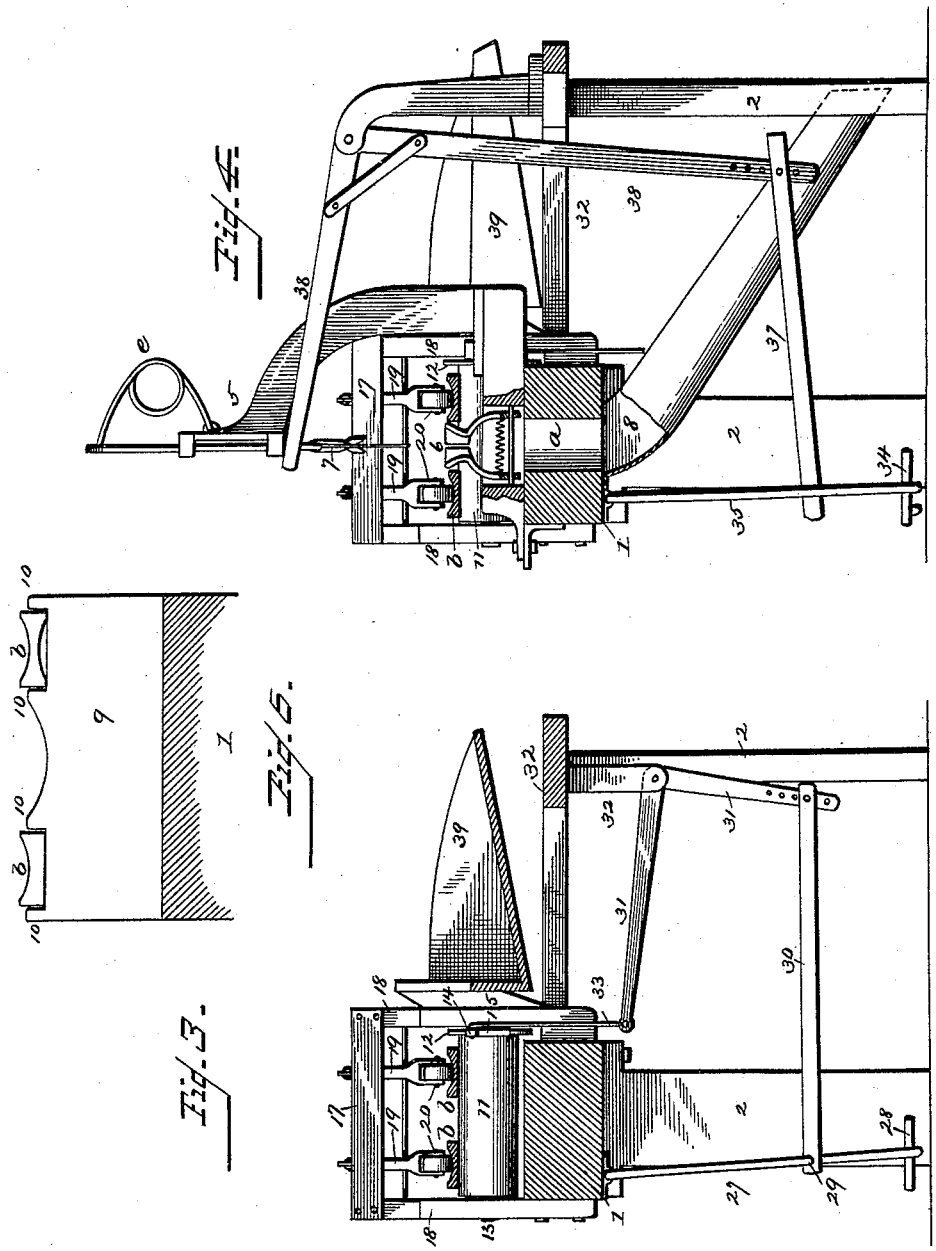

UNITED STATES PATENT OFFICE.

ARTEMAS A. KENT, OF SAN JOSÉ, CALIFORNIA, ASSIGNOR OF ONE-HALF TO JOSIAH J. CHERRIE, OF SAME PLACE.

MACHINE FOR PITTING FRUIT, &c.

SPECIFICATION forming part of Letters Patent No. 420,907, dated February 4, 1890.

Application filed October 11, 1889. Serial No. 326,696. (No model.)

*To all whom it may concern:*

Be it known that I, ARTEMAS A. KENT, a citizen of the United States, residing at San José, in the county of Santa Clara and State of California, have invented new and useful Improvements in Machines for Pitting Fruit and Spreading it upon Trays, of which the following is a specification.

My invention is directed to the production of a machine in which the operations of stoning or pitting the fruit, delivering it upon slat carriers moving in pairs past the pitting device, and transferring the loaded slat carriers to a side receiving-tray for being dried are carried on continuously. In the organization of such a machine provision is made for operating the stoning or pitting device alternately with the device for feeding the slat carriers for receiving the pitted fruit, for moving them loaded away from the pitter, and for automatically depositing them upon a laterally-transferring carriage or slide-frame in the operation of transferring them to the drying-tray.

In the organization of this machine I have shown and prefer to use the pitting device which forms the subject-matter of an application for patent filed by me July 26, 1889, Serial No. 318,719; but it will be understood that any suitable stoning or pitting device may be used in the organized machine, wherein my said invention consists of certain novel parts and combinations of parts, which are particularly pointed out and designated in the claims concluding this specification.

Referring to the drawings, Figure 1 is a top plan view of my machine for pitting fruit and spreading it upon trays, the pitting plunger-knife being removed. Fig. 2 is a longitudinal section of the same. Fig. 3 is a transverse section of the same, taken on the line $y\ y$ of Fig. 1, showing the feeding device for the slat carriers. Fig. 4 is a transverse section taken on the line $z\ z$, showing the pitting device in its relation to the slat carriers. Fig. 5 is a vertical sectional detail view of the detaching device for the slat depositing or transfer frame, showing the stop-levers in the side bars thereof; and Fig. 6 is a cross-section of the bed-beam, showing the guides for the slat carriers.

The longitudinal beam constitutes the principal part of the frame of the machine and supports the pitting-cup and the devices for carrying the pitted fruit therefrom, and is itself supported by legs 2 at a convenient height for the operator to sit in front of it at the pitting device. At the left end of the beam two arms 3 are secured to each side of this beam, so as to stand above the plane of the latter and project beyond the end thereof, as seen in Fig. 2. Between these arms are secured in transverse pairs one above the other guide-pieces 4, between which is fitted and operates a longitudinal slide-bar, to be presently explained.

The stoning or pitting device 5 is located at or about the middle of the longitudinal beam 1, with the yielding fruit-supporting cup 6, secured upon the latter, and the vertically-reciprocating knife 7, supported in position centrally above said yielding cup. In the beam below the yielding fruit-supporting cup is a vertical hole $a$, from which extends a spout 8, to receive and convey the stones away from the device.

At each side of the yielding cup 6 a cross-block 9 is secured to the top of the beam, and both are provided with guides 10 on their upper sides, between which two slat carriers $b\ b$ are fitted in longitudinal parallel relation to the beam and to each other, one at each side of the cutting and pitting device, for a purpose to be presently stated.

At a point between one of the guide-blocks 9 and the inner ends of the raised arms and above the longitudinal bed-beam 1 a roller 11 is mounted in standards fixed to said beam, so that the upper surface of said roller will be in a horizontal plane with the under sides of the slats for feeding the latter, as I shall presently state. A disk 12 is fixed upon one end of the shaft 13 of said roller and has its edge engaged by a friction-pawl 14, which is secured upon the end of an arm 15, pivoted upon said shaft. A spring 16 serves to hold said pawl against the edge of the disk, and the said disk and its roller are prevented from turning back as the pawl moves back to its working position by means of a spring-controlled stop $c$, secured in the bed-beam, as shown in Fig. 2.

The standards 18, in which the feed-roller 11 is pivoted, are connected above the roller by a cross-bar 17, and two arms 19, carrying pressure-rolls 20 upon their lower ends, are pivoted upon said cross-bar standards, and are constantly forced by springs 21 with their rolls downward upon the slats, which rest at this point upon the feed-roller, the spring for this purpose being connected to the upper end of the said arm and the said cross-bar.

To the outer end of the longitudinal slide-bar 23 is secured a block 22, the upper inner edge of which has a rabbet or step 24 to receive the ends of the slats, the said block having an inward-projecting guide $d$, for directing the slats as they are placed against it. A spring 25, secured to the inner end of this slide-bar and to a cross-piece on the beam, constantly tends to draw the end block inward.

A pendent treadle-frame 27 is pivoted to the under side of the bed-beam at a point nearly vertically beneath the bed-roller, and has a foot-rest 28 at its lower end for the left foot of the operator, and is hung so as to swing in a direction transversely of said beam. At a point above the foot-rest this swinging frame has a laterally-projecting arm 29, to which is connected and from which extends rearward a bar 30, whose opposite end is adjustably connected with a bell-crank lever 31, which is pivoted to a rear extension-frame part 32, so that its upper arm extends toward the front of the machine and vertically under the inner end of the slat-feeding roller, and connects with a vertical rod 33, whose upper end is connected with the end of the friction-pawl 14, so that the inward swing of the pendent treadle-frame 27 turns the roller 11, and thereby feeds the slats forward on each side of the pitting-cup.

At a point nearly vertically beneath the pitting-cup a second pendent treadle-frame 35 is pivoted to the under side of the bed-beam, and has a foot-rest 34 at its lower end for the right foot of the operator, and is hung so as to swing in a direction transversely of said beam. At a point above the foot-rest this swinging frame has a laterally projecting arm 36, to which is connected and from which extends rearward a bar 37, whose opposite end is adjustably connected with a bell-crank lever 38, which is pivoted to a standard on the rear extension-frame part 32, so that its upper arm extends toward the front of the machine vertically over the pitting-cup, and is connected with and operates the cutter of the pitting device, so that the inward swing of the pendent treadle-frame 35 brings down the cutter to divide the fruit in the cup and force the stone out of the latter. These two treadle-frames work alternately. First, when a slat is placed upon each side of the pitting-cup and the fruit is placed upon the cup, the operator with his right foot pushes the treadle 34 from him, which by its connections causes the cutter to descend, cutting the fruit into halves and forcing its stone down through the bottom of the cup, which for this purpose is formed into two cup-halves having a central throat and a yielding relation to each other for the discharge of the stone. The operator then releasing his foot allows the knife to be raised by means of a reacting spring $e$, and the fruit falls apart over the opposite sides of the cup, each half being thus deposited into the slats. The operator then placing his left foot upon the other treadle 28 pushes it from him, and by its friction-pawl connections with the feed-roller operates it and causes the slats to be fed along on each side of the cup just far enough to receive the next cutting. The operator then releasing the treadle allows its swinging frame to move toward the operator into a vertical position, and in doing so moves the friction-pawl in position to feed the roller after the next cutting. A tray or box 39, of suitable form, is secured upon the rear frame-extension 32 at the side of the beam near the fruit-holding cup, so as to incline toward the beam, and serves to hold the fruit to be pitted. A second frame-extension 40 is secured to the beam so as to project therefrom by the side of the frame-extension 32, and serves to support a rectangular tray-frame 41, which is open at its beam-joining side, the other three sides being provided with raised sides 42, secured to the outside strips of the tray-frame, while a middle cross-strip 43 braces and strengthens said tray-frame. A slide-frame 44 is supported upon a bracket-bar 45, projecting from the front side of the beam, and is composed of two side bars 46, connected by a third bar 47 at their outer ends, so that the side bars are free to be moved inward over the beam and over the inner end bar of the tray-frame and between the side bars 42 of the latter, the upper sides of the bars of the tray-frame and of the slide-frame being on the same horizontal plane, as seen in Figs. 1 and 2.

I will now describe the means for transferring the loaded slats as they are fed from the pitting device onto the side tray-frame which I have just described. At this end of the beam, and in openings or slots therein, are pivoted in vertical positions two levers 48 and 49, adapted to rock longitudinally and provided at their upper ends with wide head-pieces 50, which stand across and above the top of the beam, as seen in Figs. 1 and 2, and are beveled upon the sides facing the pitting device and slightly inclined away from the same. These levers are placed between the side bars 46 of the slide-frame and have their wide head-pieces 50 standing, when in vertical positions, on a plane with the under sides of the longitudinal fruit-conveying slats, while the lower ends of said levers are connected by a horizontal rod 51 below the beam, whereby they may be moved simultaneously to rock them away from or toward the pitting device. A third lever 52 is pivoted in a slot or opening in the beam at the side of the side bar of the slide-frame and rises above the plane of the fruit-conveying slats. The upper end of this lever has a head-piece 53, which stands across the top of the beam and rises above the plane of the said slats. A stop-lever 54 is pivoted within a slot in the beam between the two levers 49 and 52, and has its inclined upper end bearing against the upper cross-head piece 50 of the said lever, while its lower end is connected by a link 55 to the lever 52, pivoted in the rear end of the beam. A spring 56, secured to the lower arm of the said stop-lever and to the beam, constantly forces the upper arm of the stop-lever forward against the upper cross-piece of the lever 49, and thereby serves to maintain the vertical positions of the two connected levers, while by the rearward pushing action of the lower end of the said stop-lever against the lower end of the rear lever maintains its vertical position. The connection and relation of these three levers are such as adapt them to be moved together rearward at their upper ends, and to limit such rearward movement I have provided a stop 57, secured to the upper side of the beam at the rear side of the front lever, while the forward movement of the upper ends of these levers are limited by a stop formed by the wall of the opening in the beam, as shown in Fig. 2.

Referring to Fig. 5, it will be seen that each side bar 46 of the transferring-frame is provided on its upper side at or about the middle of its length with a stop 58, and within a slot 59 in each bar beneath such stop is pivoted a small weighted arm 60, so as to stand lengthwise of said bar, and terminates at its inner end in an upward-projecting tooth 61, the normal position of which stands above the plane of the bar 46, and is maintained in such normal position by the overbalance of its outer end and a pin or stop 62, secured in the bar, and in said normal positions these weighted toothed arms serve to push the loaded slats onto the drying-tray as the said transferring-frame is pushed inward across the beam. In withdrawing this frame from the drying-tray, the pushing ends 61 of the pivoted arms 60 are beveled to easily ride under the loaded slats, and thus leave them upon the tray. In withdrawing this slide-frame after delivering the loaded slats its outward movement is limited by a stop 63 on the outer end of the bracket-bar 45, and is thereby placed in position to receive the next pair of loaded slats from the tilting levers, which, after delivering the loaded slats, are returned to their normal vertical positions by the pressure of the spring-controlled stop-lever 54 against the upper end of the rear slat-sustaining lever, and thereby hold the two connected levers in their normal positions. In this operation it will be understood that the pair of slats which are fed by the rolls serve to feed the pair of slats previously filled with the fruit onto the lowering-levers 48 and 49 and against the upper end of the lever 52, which is caused by such feed of the slats to trip the stop-lever 54, and thus allow the slat-supporting levers to be tilted rearward to let the loaded slats down, as stated.

I prefer to make the slats hollow, the better to hold the fruit, and both sides may be so hollowed so that the slat may be put either side up within its guides, by which they are fed forward in proper alignment. It will also be understood that the projection $d$ from the rabbeted side of the end slide-bar 23 serves as a guide to hold the outer ends of the pair of slats in proper alignment until they are fed between the feed and the pressure rolls, which latter are carried to travel in the trough of each slat.

The operation of pitting and of transferring the pitted fruit to the drying-tray is effected by the operator in the following manner: On each side of the fruit-pitting cup 6 and in longitudinal parallel relation two slats $b$ are arranged so that their inner ends stand on each side of the said cup, and they are held between the feed and the pressure rolls, while two other pairs of slats are arranged in abutting relation with their outer ends resting in the rabbet 24 of the spring-controlled follower 22, so that the latter serves to feed the slats to the feed-rolls and the latter serve to feed the slats along the sides of the pitting-cup. In the described relation of the slats the fruit is placed in the cup, and the operator, sitting or standing at the front of the machine opposite the treadles and at the side of the transferring-frame, places his right foot upon and rocks the treadle 35 inward, and thereby causes the cutter 7 to descend and split the fruit and force the stone down through the bottom of the cup 6, and at the same time cause the two split parts of the fruit to fall over the top edges of the cup upon the slats which hold them. The operator releases his right foot from the treadle at the moment the cutter is forced down, and thus allows it to rise, and at once places his left foot upon the other treadle 27 and rocks it inward, which by means of its connections operates the feed-roller, and thereby feeds the two slats forward a distance sufficient to receive the next fruit as it falls from the pitting-cup. In this way the slats are fed forward and filled, the fruit being placed upon the cup each time the cutter rises, and the slats placed in position so as to maintain a continuous feed along the opposite sides of the pitting-cup by the conjoint action of the spring-controlled follower, the feed-rolls, and the guides upon the beam. As the loaded slats are fed in pairs in their guides from the pitting-cup, they are delivered upon the upper ends of the two connected levers 48 and 49 and against the trip-lever 52, whereby the upper end of the latter is forced rearward, which causes its lower end to trip the stop-lever 54, and thus allow the two connected levers 48 and 49 to be tilted, carrying their upper ends rearward by means of the weight of the loaded slats and the inclined relation thereto of the upper ends of the said connected levers, and thus lower the two slats down upon the side bars 46 of the transfer-frames and below the plane of the next succeeding pair of loaded slats. In this lowering action the levers move together, and their movement is limited so as to deliver the slats in such relation to the side receiving-tray as to allow them to be slid thereon between its raised sides. The transferring action of the slide-frame is effected as follows:

Referring to Figs. 1 and 5, it will be seen that the outside loaded slat is delivered upon the slide-frame (the latter being drawn out to its full extent) between the stops 58 and the ends of the push-arms 61 in the side bars of said frame and that the inner loaded slat is delivered upon the slide-frame at a point in advance of the ends of the push-arms. When one tray is filled, it may be removed to a drier and another tray put in its place, and the operation of the device may be made practically continuous.

Having described my invention, I claim—

1. In combination with a fruit-pitting device having a fruit-supporting cup and a drying-tray, a pair of tray-slats, means for feeding them longitudinally at both sides of the fruit-support of the pitting device, and a laterally-operated transfer-frame for transferring the loaded tray-slats over upon said drying-tray, substantially as described.

2. In combination with a fruit-pitting device having a fruit-supporting cup and a drying tray, a pair of parallel tray-slats at both sides of the fruit-support of said pitting device, a feeding device for feeding said tray-slats past said pitting device, guides for supporting said tray-slats, and a frame arranged to receive said tray-slats when loaded with fruit and sliding transversely to their line of motion to transfer said tray-slats to said drying-tray, substantially as described.

3. In a device for pitting fruit and spreading it upon trays, the combination of a pair of parallel tray-slats, guides for supporting said slats, a pitting device having a fruit-supporting cup arranged between said guides, a feeding device for said tray-slats and arranged at one side of said pitting device, a drying-tray arranged at the opposite side of said pitting device, and a transfer-frame arranged to slide into said tray to deliver the slats thereon and returned in position at the end of said guides to receive the loaded slats, substantially as described.

4. In a device for pitting fruit and spreading it upon trays, the combination of a longitudinal frame-beam having parallel guides, a pair of tray-slats adapted to slide within said guides, a fruit-holding cup between said guides, a feed-roller upon said beam for feeding said tray-slats, a drying-tray at one side of said beam, and a transfer-frame which slides transversely to said beam and into said tray, substantially as described.

5. In a device for pitting fruit and spreading it upon trays, the combination of the beam 1, having the raised end arms 3, provided with the cross-guides 4, the top guides 10, the pitting device between said top guides, the feed-roller 11, the spring-actuated pressure-rollers 20 above said feed-roller, the rabbeted end block 22, having the bar 23 between the cross-guides 4, the spring 25 for said bar, and suitable means for operating said feed-roller intermittently, substantially as described.

6. In a device for pitting fruit and spreading it upon trays, the combination, with a pitting device having a reciprocating cutter and a fruit-support, and a feed-roller for feeding pairs of tray-slats past said device and at both sides thereof, of a disk 12 upon the shaft of said feed-roller, and arm 15, pivoted upon the shaft of said roller and having a friction-pawl 14 engaging said disk, a rocking frame having a treadle 28 and a bar 30 above said treadle, an angle-lever 31, having its horizontal arm connected to said arm 15, and friction-pawl, substantially as described.

7. In a device for pitting fruit and spreading it upon trays, the combination, with a pitting device and guides for feeding a pair of tray-slats past said device, of a drying-tray arranged at the side of said pitting device and to one side of the path of said tray-slats, and a transfer-frame for the loaded tray-slats and sliding within said tray, substantially as described.

8. In a device for pitting fruit and spreading it upon trays, the combination, with a longitudinal beam or support, a pitting device, means for feeding a pair of tray-slats past said device, a drying-tray at one side of said support, and a transfer-frame sliding into said tray, of the levers 48 and 49, pivoted in said support, the trip-lever 53, pivoted in the end of said support, the rod 51, connecting the lower ends of said levers 48 and 49, the stop-lever 54, the connecting-rod 55 between said lever and the trip-lever, and the spring 56 for said stop-lever, substantially as described.

9. In a device for pitting fruit and spreading it upon trays, the combination of a tray, a transfer-frame sliding with its end pieces into said tray, stationary stops 58 upon the end pieces of said frame, and levers 60, pivoted in slots in said end pieces, and having beveled outer ends standing above the plane of said frame, substantially as described.

10. In a device for pitting fruit and spreading it upon trays, the combination of a longitudinal support, a pitting device thereon, a feeding device for feeding pairs of tray-slats past said pitting device, treadles for operating said pitting and feeding devices and arranged below the middle of said support, and a supply-tray arranged at one side of said pitting device, substantially as described.

11. In a device for pitting fruit and spreading it upon trays, the combination of the transfer-frame having the longitudinal slots 59 in its end pieces, the stationary stops 58 above said slots, and the weighted levers 60, pivoted in said slots and having the beveled upward-projecting ends 61, substantially as described.

12. In a machine for pitting fruit and spreading it upon trays, the combination, with slat-feeding rollers and frame-arms 3, having transverse guide-bars 4 4, of the bar 23, sliding between said bars, the rabbeted block 22 upon the end of said bar and formed with the beveled guide $d$, and the spring 25, attached to said sliding bar 23, substantially as described.

13. The combination, in a machine for pitting fruit and spreading it upon trays, of a fruit-supporting cup and a pitting device, with guideways arranged on each side of said cup in longitudinal relation thereto, tray-slats automatically fed in abutting alignment within said guides to receive the fruit, and a device for receiving the loaded tray-slats, consisting of vertical pivoted supports having their supporting ends inclined away from said cup and connected at their lower ends for parallel movement, means for automatically holding and tripping said supports to lower said slats, consisting of a vertical stop-lever 54, a trip-lever 53, connected with said stop-lever, and a spring connecting the latter with the frame, and a laterally-operated transfer-frame arranged beneath the plane of said guides, adapted to receive the loaded slats from their pivoted supports and transfer them at the side thereof, substantially as described.

14. The combination, with a fruit-supporting cup and a pitting-knife, of the end spring-actuated block having the rabbet 24, the guides 10, and the levers 48 and 49, the latter having their upper inclined ends arranged in the same horizontal plane with the rabbet and the bottoms of said guides, the stop-lever 54, arranged below such plane, the trip-lever 52, arranged to project above such plane, the tray-slats, the feed-rollers, and means controlled by the operator for operating the feed-rollers and the pitting-knife, whereby the slats are fed in the same horizontal plane and dropped at the end of their feed movement below said plane.

In testimony whereof I have hereunto set my hand in the presence of two subscribing witnesses.

ARTEMAS A. KENT.

Witnesses:
B. F. ENTRIKEN,
T. F. CHILDS.